(12) United States Patent
George (10) Patent No.: US 9,107,535 B2
(45) Date of Patent: Aug. 18, 2015

(54) BARBECUE AND BARBECUE ACCESSORY FOR FLARE UP PREVENTION, AND IMPROVED TEMPERATURE DISTRIBUTION AND HEAT RETENTION

(71) Applicant: Jonathan D. George, Kenaston (CA)

(72) Inventor: Jonathan D. George, Kenaston (CA)

( * ) Notice: Subject to any disclaimer, the term of this patent is extended or adjusted under 35 U.S.C. 154(b) by 390 days.

(21) Appl. No.: 13/650,212

(22) Filed: Oct. 12, 2012

(65) Prior Publication Data

US 2013/0125766 A1 May 23, 2013

Related U.S. Application Data

(60) Provisional application No. 61/562,009, filed on Nov. 21, 2011.

(51) Int. Cl.
*A47J 37/10* (2006.01)
*A47J 37/04* (2006.01)
*A47J 37/07* (2006.01)

(52) U.S. Cl.
CPC ............ *A47J 37/044* (2013.01); *A47J 37/0704* (2013.01); *A47J 37/0786* (2013.01)

(58) Field of Classification Search
CPC .. A47J 37/044; A47J 37/0704; A47J 37/0786
USPC ........ 99/323.9, 324, 360, 362, 373, 386, 403, 99/404, 419, 420, 425, 443 R, 443 C, 467, 99/473, 474, 476, 485, 480, 481, 482, 495, 99/643; 126/25 R, 21 A, 9 R; 426/523
See application file for complete search history.

(56) References Cited

U.S. PATENT DOCUMENTS

| 1,536,538 | A | * | 5/1925 | Stouffer | 99/386 |
|---|---|---|---|---|---|
| 3,646,878 | A | * | 3/1972 | Keller | 99/339 |
| 3,681,096 | A | * | 8/1972 | Oscar | 99/339 |
| 4,486,911 | A | * | 12/1984 | Beke | 15/21.1 |
| 4,757,756 | A | * | 7/1988 | Van Marr | 99/482 |
| 4,910,827 | A | * | 3/1990 | Tandberg et al. | 15/236.06 |
| 5,239,917 | A | * | 8/1993 | Lutkie et al. | 99/443 C |
| 6,707,014 | B1 | * | 3/2004 | Corey et al. | 219/494 |
| 8,418,685 | B2 | * | 4/2013 | Strauch | 126/25 R |
| 2002/0029695 | A1 | * | 3/2002 | Gongwer et al. | 99/386 |
| 2008/0141997 | A1 | * | 6/2008 | Druin | 126/39 BA |

\* cited by examiner

*Primary Examiner* — Dana Ross
*Assistant Examiner* — Joseph Iskra
(74) *Attorney, Agent, or Firm* — Kyle R. Satterthwaite; Ryan W. Dupuis; Ade & Company Inc.

(57) ABSTRACT

A barbecue accessory for addressing flare ups, uneven heat distribution, and open lid heat loss features a series of spaced-apart longitudinal members connected together in a flexible endless loop having a width less than a first one of the length and width dimensions of a barbecue firebox. A closed loop drive system is arranged for mounting in the firebox between the bottom wall to engage the flexible endless loop to drive each of the spaced apart members of the flexible endless loop in a closed-loop path back and forth along a second one of the length and width dimensions of the firebox. At least one wiping member presents an upward facing wiping surface in the firebox beneath a moving path of the longitudinal members in close proximity thereto to clean the longitudinal members as they pass the wiping member.

20 Claims, 5 Drawing Sheets

BARBECUE AND BARBECUE ACCESSORY FOR FLARE UP PREVENTION, AND IMPROVED TEMPERATURE DISTRIBUTION AND HEAT RETENTION

CROSS REFERENCE TO RELATED APPLICATIONS

This application claims benefit under 35 U.S.C. 119(e) of U.S. Provisional Patent Application Ser. No. 61/562,009, filed Nov. 21, 2011.

FIELD OF THE INVENTION

The present invention relates to barbecues, and more particularly to devices for preventing flare-ups and improving temperature distribution and heat retention when cooking food items on a barbecue.

BACKGROUND OF THE INVENTION

Three well known problems when cooking with a gas barbecue are: 1) flare ups while cooking; 2) uneven cooking temperature, also referred to as "hot spots" or "cold spots" in a gas barbeque; and 3) a rapid loss in cooking temperature when opening the barbecue lid to check on or turn food being cooked.

Previous solutions attempting to address the first one or two of the above issues often employ a mechanism for rotating the grill of a round barbecue so that the food on different areas of the grill remain in motion and are exposed to the different parts of the overall cooking area.

Another proposed solution has been to instead rotate the burner of a gas grill so that the source of flame moves around the cooking area to evenly distribute heat and avoid scorching by prolonged exposure of any given piece of food to a flare up of the flame.

Yet another prior art proposal suggests supporting charcoal or wood in a rotating tray situated below the grill but elevated above the stationary bottom of the barbecue.

When cooking with skewers, another solution has been to provide a mechanism that holds multiple radially-oriented skewers at a central point over the barbecue grill and rotates to revolve the skewers around the grill.

However, it is clear that these 'rotational' solutions of the prior art rely on mechanisms that are only suitable for barbecues of round circumference. Accordingly, there remains a need for solutions that address one or more of the above listed problems when cooking with a rectangular barbecue grill.

SUMMARY OF THE INVENTION

According to a first aspect of the invention there is provided a barbecue accessory for use with a barbecue firebox having a bottom wall, peripheral walls projecting upward from the bottom wall around a perimeter thereof, a grill supported over the bottom wall at a height spaced thereabove, and an open top end delimited by the peripheral walls in a shape having a length dimension and a width dimension perpendicular to said length direction, the accessory comprising:

a series of longitudinal members arranged side by side and each having a longitudinal dimension sized to fit within the firebox below the open top end thereof in an orientation extending along a first one of the length and width dimensions of the firebox; and a drive system arranged for mounting on the firebox and for engagement with the series of longitudinal members in a manner operable to drive displacement of said series of longitudinal members in each of two opposing directions along a second one of the length and width dimensions of the firebox.

According to a second aspect of the invention there is provided a barbecue comprising:

a firebox having a bottom wall, peripheral walls projecting upward from the bottom wall around a perimeter thereof, and an open top end delimited by the peripheral walls in a shape having a length dimension and a width dimension perpendicular to said length direction:

a grill supported over the bottom wall of the firebox at a distance upward therefrom;

a series of longitudinal members disposed within the firebox beneath the grill, arranged side by side with one another and each having a longitudinal dimension extending along a first one of the length and width dimensions of the firebox; and a drive system mounted on the firebox and engaged with the series of longitudinal members in a manner operable to drive displacement of said series of longitudinal members in each of two opposing directions along a second one of the length and width dimensions of the firebox.

According to a third aspect of the invention there is provided a barbecue accessory for use with a firebox having a bottom wall, peripheral walls projecting upward from the bottom wall around a perimeter thereof, a grill supported over the bottom wall at a height spaced thereabove, and an open top end delimited by the peripheral walls in a shape having a length dimension and a width dimension perpendicular to said length direction, the accessory comprising:

a series of spaced apart members connected together in a flexible endless loop having a width less than a first one of the length and width dimensions of the firebox; and a closed loop drive system arranged for mounting in the firebox between the bottom wall and the grill and for receipt of the flexible endless loop in an entrained manner around members of the closed loop drive system to drive each of the spaced apart members of the flexible endless loop in a closed-loop path back and forth along a second one of the length and width dimensions of the firebox.

According to a fourth aspect of the invention there is provided a barbecue comprising:

a firebox having a bottom wall, peripheral walls projecting upward from the bottom wall around a perimeter thereof, and an open top end delimited by the peripheral walls in a shape having a length dimension and a width dimension perpendicular to said length direction:

a grill supported over the bottom wall of the firebox at a distance upward therefrom;

a series of spaced apart members connected together in a flexible endless loop disposed within the firebox between the bottom wall and the grill, the flexible endless loop having a width that is aligned with and less than a first one of the length and width dimensions of the firebox; and a closed loop drive system mounted in the firebox between the bottom wall and the grill, the closed loop drive system having the flexible endless loop entrained thereabout to drive each of the spaced apart members of the flexible endless loop in a closed-loop path back and forth along a second one of the length and width dimensions of the firebox.

Preferably the at least one drive sprocket comprises a plurality of drive sprockets carried on a common drive shaft at spaced apart positions therealong.

Preferably the drive mechanism further comprises at least one idler about which the endless loop is entrained.

The at least one idler and the drive sprocket may define opposite ends of the closed loop path of the flexible endless loop.

Preferably teeth of the drive sprocket are received in spaces between pairs of adjacent ones of the longitudinal members to use contact of said teeth with the longitudinal members to convey the same.

There may be provided a motor coupled to the drive system for powered operation thereof.

Alternatively or additionally, there may be provided a manual input mechanism for coupling to the drive system for manual operation thereof.

Preferably there is provided at least one wiping member presenting at least one upward facing wiping surface in the firebox beneath a moving path of the longitudinal members in close proximity thereto.

Preferably the at least one upward facing wiping surface comprises a plurality of wiping surfaces situated along the second one of the length and width dimensions of the firebox at positions separated by empty spaces between said wiping surfaces.

The at least one wiping member may comprise a plurality of wiping members situated along the second one of the length and width dimensions of the firebox at positions separated by empty spaces between said wiping members.

BRIEF DESCRIPTION OF THE DRAWINGS

In the accompanying drawings, which illustrate exemplary embodiments of the present invention.

DETAILED DESCRIPTION

Figure 1:
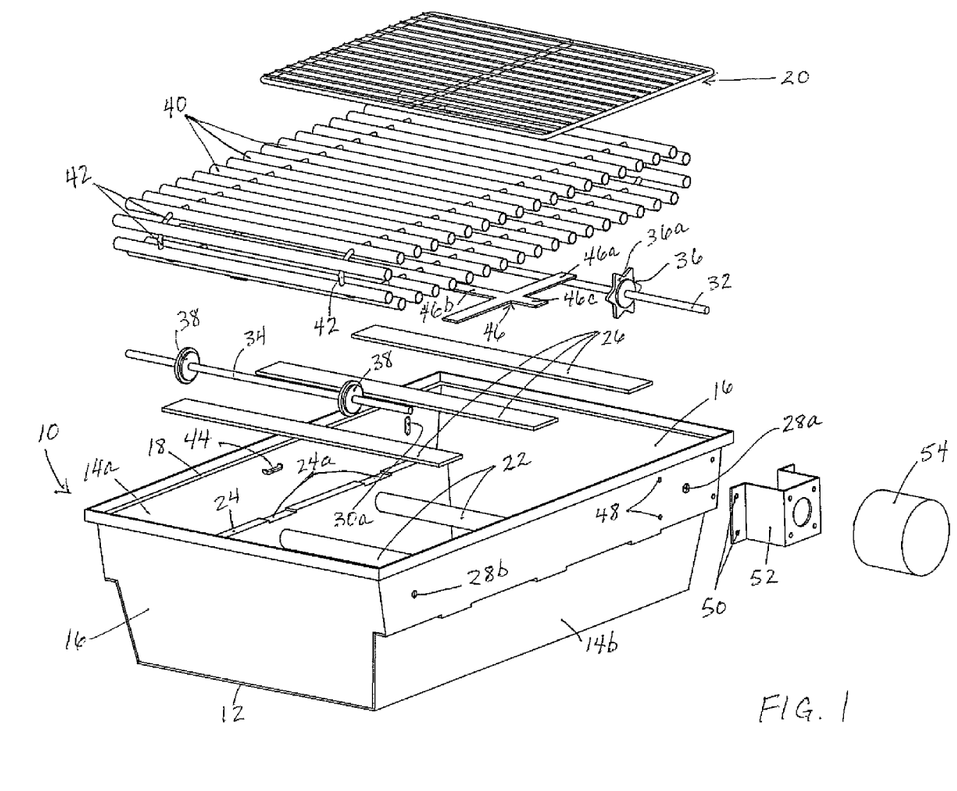
FIG. 1 is an exploded perspective view of a barbecue firebox of a first embodiment the present invention, which employs a mechanism for conveying a series of longitudinal members back and forth along the firebox beneath the grill to reduce flare ups, limit exposure to same, and improve heat distribution and retention.
Figure 2:
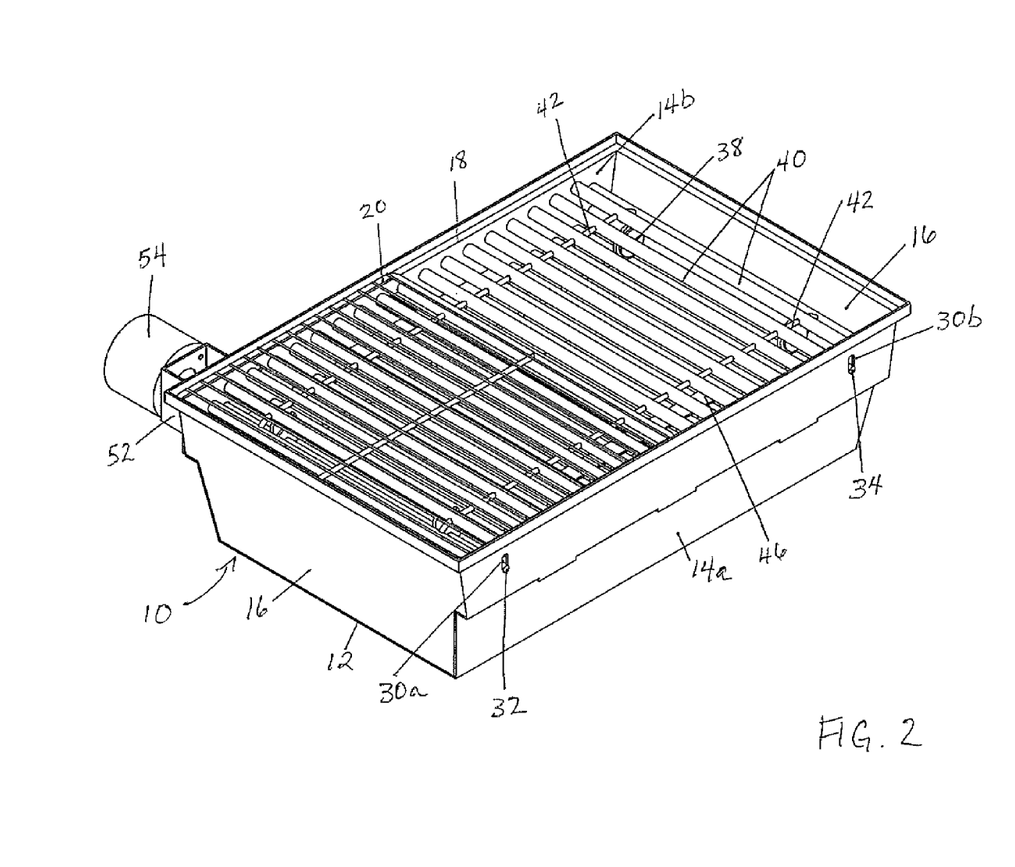
FIG. 2 is an assembled perspective view of the barbecue firebox of FIG. 1, which has one grill section removed for illustrative purposes.
Figure 3:
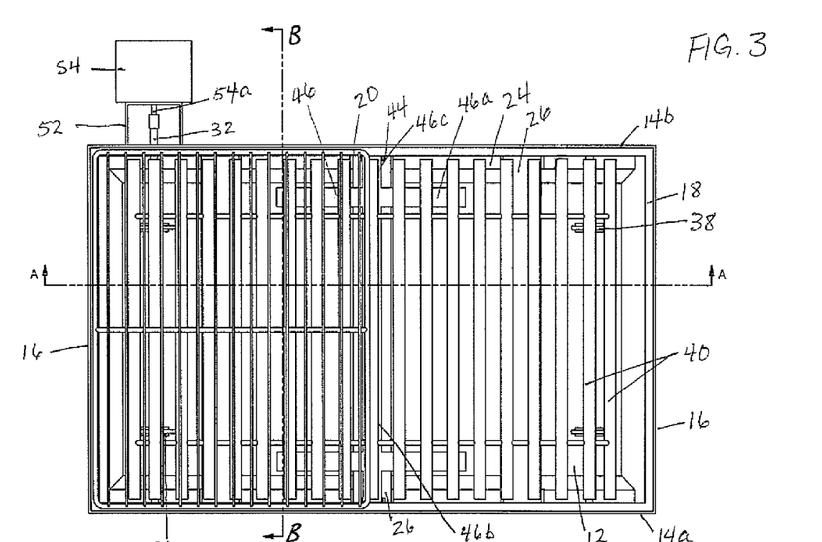
FIG. 3 is an overhead plan view of the barbecue firebox of FIG. 2.
Figure 4:
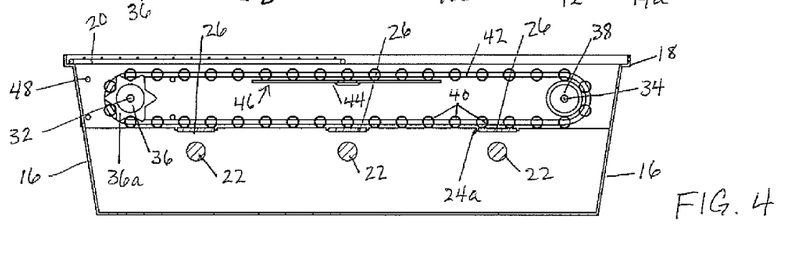
FIG. 4 is a cross-sectional view of the barbecue firebox of FIG. 3 as taken along line A-A thereof.
Figure 5:
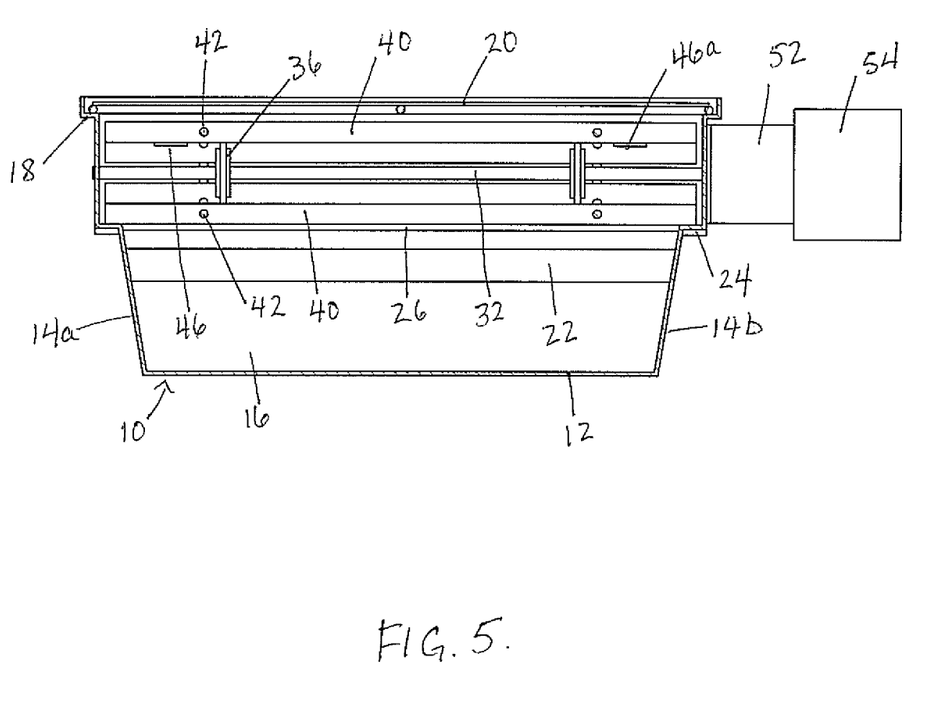
FIG. 5 is a cross-sectional view of the barbecue firebox of FIG. 3 as taken along line B-B thereof.

FIG. 1 illustrates a device for use in cooking food items on the grill of a barbecue. The barbecue features a generally rectangular firebox 10 having a rectangular bottom wall 12 with two sides that are longer than the two ends interconnecting those sides. Two side walls 14a, 14b project upward from and extend along the two longer sides of the bottom wall 12, and two end walls 16 likewise project upward from the two ends of the bottom wall 12 and extend therealong in order to interconnect the two side walls 14a, 14b to form an enclosure around the firebox's interior space defined above the bottom wall 12. The top end of the firebox 10 opposite the bottom wall 12 thereof is open and has a rectangular shape delimited by the side and end walls 14a, 14b, 16. A small horizontal ledge or shoulder is defined on the interior side of each of the side and end walls 14a, 14b, 16 a short distance below the top end thereof to present a small inner rim 18 extending around the perimeter of the firebox, on which a pair of rectangular grill sections (one of which is shown in the drawings, as indicated at 20) can be seated to define a grill substantially spanning the top end of the firebox. These conventional aspects of the illustrated firebox are accompanied by conventional mounting of gas burner tubes 22 at a height above the bottom wall at a height well below the grill 20.

The firebox 10 of the first illustrated embodiment differs from a conventional barbecue firebox in the presence of a second horizontal ledge 24 on each of the side walls 14a, 14b at a distance below the grill-supporting rim 18, but shortly above the elevation at which the top of the burner tubes 22 reside, in the presence of a plurality of holes or openings extending through the side walls 14a, 14b at elevations between the grill-supporting rim 18 and the lower horizontal ledge 24, and the presence of a bracket 44 on the inside of each of the two side walls at a height between the lower ledge 24 and the upper rim 18. The purpose of these features is outlined herein further below in association with other components of the illustrated embodiments.

A series of flat elongated rectangular bars or plates 26, of which there are three in the illustrated embodiments, each have a length just shy of the horizontal width of the firebox (measured perpendicularly between the side walls 14a, 14b thereof) at the lower ledges 24 so that each bar 26 can be seated on the two ledges within the firebox interior to extend perpendicularly between the side walls 14a, 14b in a horizontal plane. As shown in the first embodiment, each ledge 24 may feature a series of vertically recessed portions 24a disposed along its length to positively position the bars 26 at respective positions, in which the bars 26 of preferably equal width are preferably separated by equal spacing between sequentially adjacent bars along the length of the firebox.

Adjacent each end of one of the side walls 14b, a respective circular through hole 28a, 28b extends through the side wall 14b at an intermediate height between the lower ledge 24 of the upper rim 18. In the opposing side wall 14a, a respective elongated slot 30a, 30b is defined adjacent each end of that wall and has a vertically oriented longitudinal dimension that exceeds a width of the slot, which is similar to the diameter of the corresponding circular through-hole 28a, 28b in the other side wall 14b. Each circular through-hole 28a, 28b aligns with a lower portion of the corresponding slot 30a, 30b in the opposing side wall. Near one of the end walls 16, opposite ends of a drive shaft 32 extend through the respective circular through hole 28a and slot 30a to support the drive shaft 32 in a horizontal position extending across the interior of the firebox in the width direction thereof perpendicular to the side walls 14a, 14b. Near the other end wall, an idler shaft 34 likewise extends through the respective circular through hole 28b and slot 30b. The two shafts 32, 34 thus extend parallel to one another at the same elevation above the bottom of the firebox near opposing ends 16 thereof. The use of elongated slots in one of the side walls eases the process of installing the respective shaft. However, it will be appreciated that the shapes and sizes of the openings may be varied.

The drive shaft 32 has two drive sprockets 36 fixed thereon at spaced positions therealong for coaxial rotation therewith inside the firebox 10, preferably each at the same distance from a corresponding one of the side walls. The idler shaft 34 has two idler rollers 38 likewise fixed thereon fixed thereon at spaced positions therealong for rotation therewith inside the firebox 10, preferably each at the same distance from a corresponding one of the side walls and preferably aligned with the drive sprockets. The drive sprockets and the idler rollers are each smaller in diameter than the elevation difference between the lower ledge 24 and upper grill-supporting rim 28 of the firebox side walls.

A series of equally sized elongated members 40, preferably in the form of rods, bars, or hollow tubes lie parallel to one another and are all linked together by two flexible members 42 that each extend from one elongated member to the next in a direction transverse to the elongated member's longitudinal direction. The two flexible members form two closed loops of equal size, thereby joining the elongated members 40 in an endless loop. The length of each elongated member 40 is slightly shorter than the width of the firebox 10 over the portion of the side walls 14a, 14b spanning from the lower ledges 24 up to the grill-supporting upper rim 18. The common length shared by the equally-sized elongated members defines a width of the endless loop, which is thereby sized to fit within the width of the firebox between the lower ledge 24 and the upper rim 18. The endless loop of linked together elongated members 40 is entrained about the drive sprockets 36 near one of the firebox and around the idler rollers 38 near the other end of the firebox, whereby under ongoing rotation of the drive shaft 32, each elongated member 40 of the endless loop moves through a closed-loop path, first moving along the lengthwise dimension of the firebox in one direction beneath the grill at a first distance above the lower ledge 24, then turning through 180-degrees about the drive sprockets or idler rollers to then travel along the same lengthwise dimension of the firebox in the opposite direction at a lower elevation closer to, but still above, the lower ledge 24. The assembly of elongated members is thus driven in a manner similar to a conveyor belt or treadmill to run in a closed loop back and forth along the firebox at a position below the grill over substantially the full length of the firebox interior.

In each illustrated embodiment, teeth 36a of the two drive sprockets are received in the open spaces between adjacent ones of the elongated members 40 at respective locations adjacent and between the two flexible members 42. Accordingly, it is contact of the leading edge of the tooth 36a against one of the two adjacent elongated members under rotation of the drive sprocket that drives the assembly of elongated members. The flexible members 42 therefore do not require features suitable for engagement by the sprocket teeth. In the illustrated embodiments, each flexible member 42 is a wire rope that has been threaded through transverse holes in the elongated members. To maintain a sufficient spacing between each pair of adjacent elongated members for receipt of the sprocket teeth in these spaces, a short metal sleeve may be fitted around the portion of wire rope between the two elongated members, whereby use of equal-length sleeves provides generally uniform spacing between the elongated members of the assembly. However, it will be appreciated that other embodiments may employ chains as the flexible members, wherein the elongated members are fixed to outer sides of the links of the chain opposite the inner side of the chain where the teeth of the sprocket engage into the links. Also, although the idlers of the illustrated embodiments are toothless rollers with a round circumference, it will be appreciated that idler sprockets may alternatively be employed to engage the assembly in the same manner as the drive sprockets.

A u-shaped bracket 44 is fixed to the inner face of each side wall 14a, 14b to face the open end of its squared-off u-shape upward at a central location along the length of the side wall at an elevation between the lower ledge 24 and the upper rim 18 and above the circular through holes 28a, 28b to support an additional bar or plate 46. The additional plate 46 has three linear sections consisting of two parallel sections 46a each running parallel to the side walls 14a, 14b a short distance inward therefrom, and a third section 46b perpendicularly interconnecting the other two and extending slightly past each one thereof. This stub portion 46c projecting past the respective one of the two parallel sections 46a has its end seated atop the u-shaped bracket 44 to suspend the plate 46 between the two side walls 14a, 14b of the firebox.

The side wall 14b with the circular through holes features mounting holes 48 spaced outward from the circular through hole 28a through which the driveshaft 32 extends for alignment with fastener holes 50 in a mounting bracket 52 for supporting an electric motor 54 on the exterior of the firebox 10 in a position aligning the rotational axis of the motor 54 with the circular through-hole 28a. The electric motor has an output shaft 54a coupled to a keyed end of the driveshaft 32 that projects out from the firebox 10 at the circular through-hole 28a so that operation of the motor 54 drives rotation of the drive shaft and drive sprockets in order to drive the assembly of elongated members 40 within the firebox interior. A hand crank may instead be coupled to the outside end of the driveshaft for manual operation of the drive mechanism.

The system operates as follows. While cooking food items on the grill using heat from the burners, drippings from the food items fall from the grill. However, unlike a conventional barbecue where the drippings fall into the flames below, most of the falling drippings are interrupted by the elongated members 40 moving along the grill a short distance therebeneath. The rectangular bars 26 are positioned to present their upper rectangular faces in very close proximity to the undersides of the elongated members 40 as they move through the lower-pass of their closed-loop path around the sprockets and rollers of the drive system. Likewise the additional bar 46 positioned higher up in the firebox to reside between the upper and lower passes of the closed-loop path of the elongate member assembly is positioned to situate its flat upper face in very close proximity to the undersides of the elongated members 40 as they move through the upper-pass of their closed-loop path around the sprockets and rollers of the drive system. It will be appreciated that the term underside is being used to describe the downward facing portion of an elongated member at any given moment, as the portion of the elongated member that faces downward will change as the member transitions between the upper and lower passes of the closed-loop path around the drive mechanism.

The bars 26, 46 thus operate as wipers that will clean built-up drippings from the undersides of the elongated members as they move past these bars. Likewise, as drippings build up on these upward facing wiping surfaces of the bars, the contact of the elongated members moving over the bars will clean the bars by displacing the dripping off the edges thereof, where the drippings will fall toward the bottom of the firebox. During movement through the upper pass, drippings falling on the elongated members will collect somewhat on the topsides thereof, but may also tend to flow or pool around the round cylindrical surface of the members. Both sides of the bar will eventually be wiped down as it moves onward through both passes of the closed-loop path, thereby providing a notable cleaning action on the bar.

Regarding the somewhat H-shaped configuration of the upper bar 46 that presents portions extending in both the lengthwise and cross-wise directions of the firebox and grill, this acts to provides support to the elongated bars/tubes 40 during the upper pass of their rotation around the closed-loop path, keeping this upper level of bars/tubes level with one another and close to the underside of the grill, while also wiping the underside of the bars in the upper pass. That is, the lengthwise sections 46a of the bar 46 provide upward facing horizontal support surfaces that each span a substantial portion of the grill's lengthwise dimension to support the elongated members 40 as they slide thereover during their upper pass around the closed-loop path, while the cross-wise section 46b provides an upward facing horizontal wiping surfaces over which each elongated member 40 momentarily crosses during this upper pass movement to wipe the underside of the elongated member 40. The support provided by the upper bar 26 also reduces the level of tightness to which closed-loop assembly of bars/tubes 40 is engaged around the sprockets and rollers to prevent significant sagging of the bars/tubes 40 therebetween. The reduced tightens may help reduce wear and reduce the amount of input energy required to drive the system. It will be appreciated that other shapes may be employed to provide lengthwise support surfaces and one or more cross-wise wiping surfaces. For example, another embodiment may employ a plus—(+) or cross-shaped top bar.

The lower bars 26 are positioned in close proximity over the burner tubes 22, and therefore are heated to high temperatures by the flames. This helps retain heat in the firebox when the lid (not shown) thereof is opened, as a portion of the heat from the flames that would normally dissipate directly to the atmosphere through the openings of the grill 20 is being instead being absorbed by the lower bars 26. Drippings falling or being wiped onto the lower bars 26 also provide flavor to the food items on the grill due to the aroma released when the drippings are exposed to the high temperatures of the bars. Having multiple bars 26 spaced apart over the area of the firebox, the heat retained by the bars and subsequently released also aids in providing a more even heat distribution over the full cooking area.

Do to the moving nature of the elongated bars that catch most of the drippings, the drippings do not have a chance to pool or collect into sufficient volumes that will cause notable flare-ups from the burners.

The above system thus provides improvement over prior solutions. Previously, lava rocks and similar materials were used to catch drippings and retain heat but they would eventually get saturated and flare up. To try and eliminate flare ups, most barbecues today use burner tents or a heat plate/shield to keep drippings from touching the burner or flame. These are made of a thin metal and have very little heat retention and have not solved the problem of flare ups or uneven cooking temperature. In the system disclosed herein, elongated members, which may be called flavor bars are located between the burners and the cooking grill/grid of a gas barbecue and rotate in a closed loop to eliminate the build up of drippings in any one location that causes flare-ups, while also creating even heat throughout the barbeque. Flat bars that are located just above the burners get very hot and give the barbecue flavor when drippings are transferred from the rotating flavor bars to the flat bars or wiper bars. Because the flat bars are continuously being wiped by the rotating flavor bars, they also do not flare up.

Figure 6:
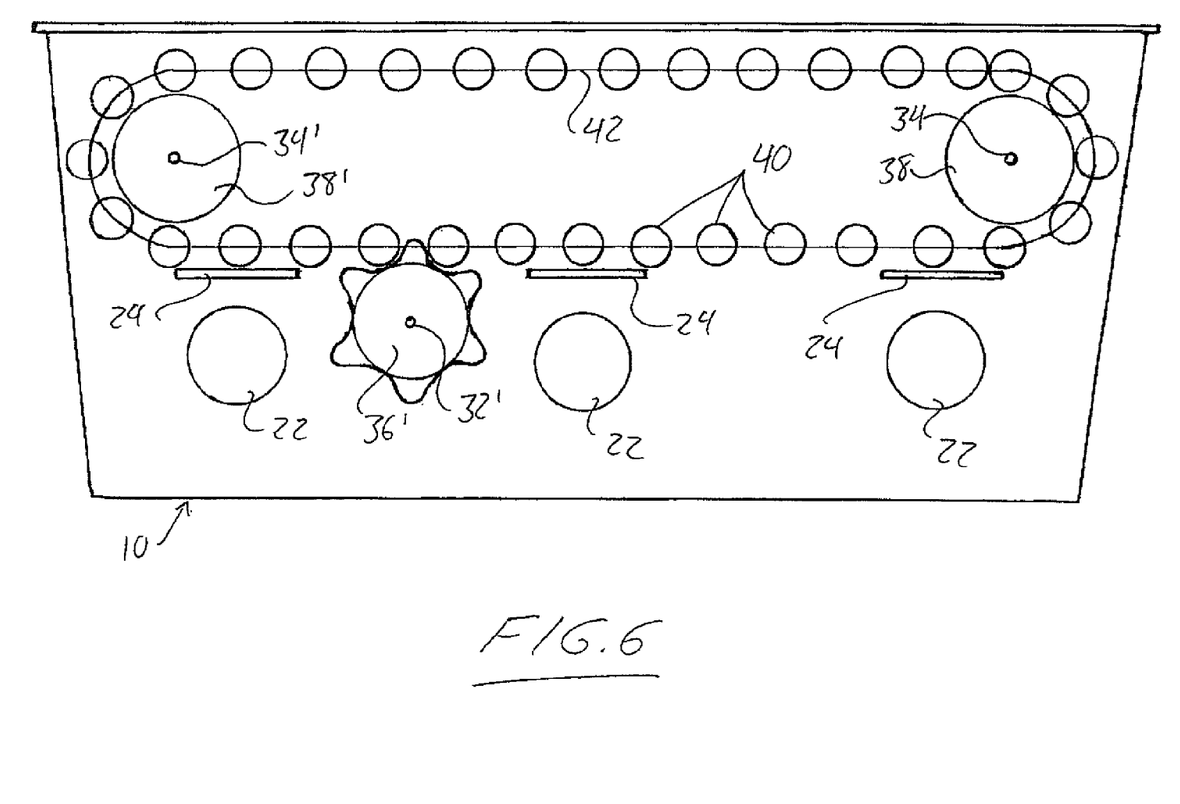
FIG. 6 is a schematic cross-sectional view of a second embodiment barbecue firebox, as viewed along the same plane as FIG. 4.

FIG. 6 schematically illustrates a second embodiment which differs from the first in that the motor is repositioned at a different location on the firebox so that the drive shaft 32' and the drive sprockets 36' mounted thereon are not positioned within the endless loop of linked together elongated members 40, but rather below it. Accordingly, the position of the drive shaft and sprocket assembly of the first embodiment inside the endless loop of elongated members adjacent one end of the firebox is instead occupied by a second idler shaft and roller assembly 34', 38'. This positioning of the drive shaft and sprocket assembly 32', 36' outside and below the endless loop of linked together elongated members 40 at a location between two of the lower wiper bars 26 means that the endless loop of elongated members can be removed from the firebox, together with the two idler shafts 34, 34' and two sets of idler rollers 38, 38', whether for cleaning or other reasons, without having to disengage the drive shaft from the motor.

While the preferred embodiment employs the moving elongated members and two layers of wipers for maximum heat retention and distribution and cleaner operation, it will be appreciated that the moving members may be employed without any wipers while still helping reduce flare-ups by conveying drippings throughout the firebox to prevent them from pooling or collecting and helping distribute heat evenly over the cooking area (as the moving members collect some heat themselves, particularly during the lower pass, and then release heat as they continue moving around the firebox interior). The first embodiment is shown as including a specialized firebox having preconfigured features from the manufacturer to support the bars, shafts and motor, but it will be appreciated that the system may additionally or alternatively be commercialized as an aftermarket add-on or accessory for existing barbeques. For example, such an embodiment may include a preconfigured frame designed to fit within an existing barbecue firebox to support the bars, and instructions on how to add mounting holes for the shafts, and the motor bracket if the embodiment features a motorized drive system.

While the illustrated embodiments employ hollow tubes of circular cross-section so that the round periphery has no corners or edges to catch on the wiping bars, it may be possible to have elongated members, hollow or solid, of other cross-sectional shapes. Also, the illustrated embodiments each have the width of the endless loop (i.e. the length of the elongated members) oriented in the shorter width direction of the firebox, and the drive system arranged to convey the elongated members in the longer length direction of the firebox, but alternate embodiments may reverse this configuration, and accordingly relocate the shaft supporting and drive features from the longer side walls to the shorter end walls. The system may also be used with a square grill where the walls of are of equal size, while still using the same principal of providing coverage over substantially the entire grill by using elongated members to span one dimension and the movement of the elongated members to provide cover the other dimension. Also, while the illustrated embodiments each use a single closed-loop structure with longitudinal members each substantially spanning the width of the firebox, other arrangements may achieve a similar result. For example, two separate loops may run side by side to substantially span the grill.

The components of the above system are exposed to significant heat, and so prototypes of the system employ metal pieces for all components, including the elongated members 40, flexible members 42, upper and lower bars 26, 46, shafts 32, 34, sprockets 36, rollers 38 and motor bracket 52. It will be appreciated that the number of lower bars 26 may match the number of burners, as in the illustrated embodiments where three burner tubes 22 are used in a three-burner barbecue, or may be provided in a number greater than or less than the number of burners. In a prototype of the present invention, the flat lower bars are 2-inches wide, the elongated tubes/bars are ¾-inch in diameter and the round tube burners are just over 1-inch in diameter, but it will be appreciated that the dimensions may be altered. In the illustrated embodiments, where the lower bars 26 are aligned directly overhead of the respective burners and thus keep drippings from falling thereon, conventional heat shields are omitted. However, heat shields may additionally be present over the burners at an elevation below the bars, especially in embodiments where the bars don't directly overlie the burners. The number of drive sprockets and idlers may of course also be varied without affecting the general function of the drive system.

In addition, the holes or openings 28a, 28b, 30a, and 30b for supporting the driveshaft and idler shaft could alternatively be grooves or indents in the firebox (for example, made during the manufacturing process of pressing, stamping, or casting the shape of the firebox), or be u-shaped brackets attached to the inner face of each side wall. The two shafts would rest in these grooves or indents, or u-shaped brackets, and only one hole would be needed at the input end of the driveshaft for connection to the external motor or hand crank. This would allow the two shafts to be slightly shorter than the inside measurement of the firebox allowing easier installation of the shafts by dropping or lowering thereof straight down into their final working positions.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A barbecue accessory for use with a gas barbecue firebox having a bottom wall, peripheral walls projecting upward from the bottom wall around a perimeter thereof to delimit an interior of the firebox that has a length dimension and a width dimension that is perpendicular to said length direction, a stationary cooking grill supported on the peripheral walls of the firebox in a static position residing over the bottom wall at a height spaced thereabove within the interior of the firebox for acceptance of food atop said grill, and one or more gas burner tubes mounted in the interior of the firebox above the bottom wall and beneath the grill for heating of said food received atop said cooking grill, the accessory comprising:
a series of longitudinal members of heat absorbing material arranged side by side and each having a longitudinal dimension sized to fit within the interior of the firebox below the cooking grill and above the one or more gas burner tubes in an orientation extending along a first one of the length and width dimensions of the firebox; and
a drive system arranged for mounting on the firebox in a position beneath the cooking grill and above the one or more gas burner tubes within the interior of the firebox, and arranged for engagement with the series of longitudinal members in a manner operable to drive displacement of said series of longitudinal members in each of two opposing directions along a second one of the length and width dimensions of the firebox such that the position of the longitudinal members beneath the cooking grill and above the one or more gas burners catches drippings from the cooking grill to prevent flare-ups at the one or more gas burners, and conveyance of the longitudinal members by the drive system moves the bars over the one or more gas burners to collect heat therefrom, and displaces the one or more gas burners from over the gas burners to distribute heat throughout the interior of the firebox.

2. The accessory of claim 1 wherein the series of longitudinal members are interconnected with one another for movement together as a single unit.

3. The accessory of claim 1 wherein the series of longitudinal members are connected together in a flexible endless loop arranged to be engaged by at least one drive sprocket of the drive mechanism.

4. The accessory of claim 3 wherein the at least one drive sprocket comprises a plurality of drive sprockets carried on a common drive shaft at spaced apart positions therealong.

5. The accessory of claim 3 wherein the drive mechanism further comprises at least one idler about which the endless loop is arranged to be entrained about.

6. The accessory of claim 5 wherein the at least one idler and the drive sprocket are arranged to define opposite ends of closed loop path of the flexible endless loop.

7. The accessory of claim 3 wherein the drive sprocket is arranged to engage the flexible endless loop of the longitudinal members by insertion of teeth of the drive sprocket into spaces between pairs of adjacent ones of the longitudinal members to use contact of said teeth with the longitudinal members to convey the same.

8. The accessory of claim 1 comprising at least one wiping member arranged to present at least one upward facing wiping surface in the firebox beneath a moving path of the longitudinal members in close proximity thereto.

9. The accessory of claim 8 wherein the at least one upward facing wiping surface comprises a plurality of wiping surfaces situated along the second one of the length and width dimensions of the firebox at positions separated by empty spaces between said wiping surfaces.

10. The accessory of claim 8 wherein the at least one wiping member comprises a plurality of wiping members situated along the second one of the length and width dimensions of the firebox at positions separated by empty spaces between said wiping members.

11. A barbecue comprising:
a firebox having a bottom wall, peripheral walls projecting upward from the bottom wall around a perimeter thereof to delimit an interior of the firebox that has a length dimension and a width dimension perpendicular to said length direction:
a stationary cooking grill supported on the peripheral walls of the firebox in a position residing over the bottom wall of the firebox at a distance upward therefrom inside the interior of the firebox for acceptance of food atop said grill;
one or more gas burner tubes mounted in the interior of the firebox above the bottom wall and beneath the grill for heating of said food received atop said cooking grill;
a series of longitudinal members of heat absorbing material disposed within the interior of the firebox beneath the cooking grill and above the one or more gas burner tubes, the longitudinal members being arranged side by side with one another and each having a longitudinal dimension extending along a first one of the length and width dimensions of the firebox; and
a drive system mounted on the firebox in a position beneath the grill and above the one or more gas burner tubes within the interior of the firebox, the drive system being and engaged with the series of longitudinal members in a manner operable to drive displacement of said series of longitudinal members in each of two opposing directions along a second one of the length and width dimensions of the firebox such that the position of the longitudinal members beneath the cooking grill collects drippings therefrom, and conveyance of the longitudinal members by the drive system moves the bars over the one or more gas burners to collect heat therefrom, and displaces the one or more gas burners from over the gas burners to distribute heat throughout the interior of the firebox.

12. The barbecue of claim 11 wherein the series of longitudinal members are interconnected with one another for movement together as a single unit.

13. The barbecue of claim 11 wherein the series of longitudinal members are connected together in a flexible endless loop engaged by at least one drive sprocket of the drive mechanism inside the firebox.

14. The barbecue of claim 13 wherein the at least one drive sprocket comprises a plurality of drive sprockets carried on a common drive shaft at spaced apart positions therealong.

15. The barbecue of claim 13 wherein the drive mechanism further comprises at least one idler about which the endless loop is entrained.

16. The barbecue of claim 15 wherein the at least one idler and the drive sprocket define opposite ends of closed loop path of the flexible endless loop.

17. The barbecue of claim 13 wherein teeth of the drive sprocket are received in spaces between pairs of adjacent ones of the longitudinal members to use contact of said teeth with the longitudinal members to convey the same.

18. The barbecue cooking accessory of claim 11 comprising at least one wiping member presenting at least one upward facing wiping surface in the firebox beneath a moving path of the longitudinal members in close proximity thereto.

19. The barbecue cooking accessory of claim 18 wherein the at least one upward facing wiping surface comprises a plurality of wiping surfaces situated along the second one of the length and width dimensions of the firebox at positions separated by empty spaces between said wiping surfaces.

20. The barbecue cooking accessory of claim 18 wherein the at least one wiping member comprises a plurality of wiping members situated along the second one of the length and width dimensions of the firebox at positions separated by empty spaces between said wiping members.

\* \* \* \* \*